United States Patent [19]

Edahiro et al.

[11] Patent Number: 4,973,069

[45] Date of Patent: Nov. 27, 1990

[54] REAR SUSPENSION SYSTEM FOR FOUR-WHEEL-STEERED VEHICLE

[75] Inventors: Takeshi Edahiro; Seita Kanai; Kouichi Ushio, all of Hiroshima, Japan

[73] Assignee: Mazda Motor Corporation, Hiroshima, Japan

[21] Appl. No.: 441,697

[22] Filed: Nov. 27, 1989

[30] Foreign Application Priority Data

Nov. 28, 1988 [JP] Japan ................................ 63-298314

[51] Int. Cl.$^5$ ............................................. B62D 6/02
[52] U.S. Cl. ....................................... 280/91; 180/140; 180/141
[58] Field of Search .................. 280/91; 180/140, 141, 180/142

[56] References Cited

U.S. PATENT DOCUMENTS

| | | | |
|---|---|---|---|
| 4,295,657 | 10/1981 | Sano et al. ............................. | 280/91 |
| 4,601,357 | 7/1986 | Miyoshi et al. ...................... | 180/140 |
| 4,805,939 | 2/1989 | Kanazawa et al. .................. | 280/91 |
| 4,805,940 | 2/1989 | Ohno et al. ............................ | 280/91 |
| 4,840,243 | 6/1989 | Hirabayashi et al. ................. | 280/91 |

FOREIGN PATENT DOCUMENTS 2124167B 2/1984 United Kingdom .

*Primary Examiner*—Kenneth R. Rice
*Attorney, Agent, or Firm*—Sixbey, Friedman, Leedom & Ferguson

[57] ABSTRACT

A four-wheel-steered vehicle is provided with a front wheel turning mechanism and a rear wheel turning mechanism which respectively turn front and rear wheels in response to the rotation of a steering wheel. The rear wheels are turned in the same direction as the front wheels when the steering wheel is turned while the vehicle is in a predetermined operating condition. A rear suspension system which supports a rear wheel has a wheel support which supports a rear wheel and is connected to a rear wheel turning rod of the rear wheel turning mechanism so that the rear wheel on the wheel support is turned about a king pin axis when the rear wheel turning rod member is displaced. Upper and lower arms are connected to the wheel support and guide the wheel support so that the rear wheel on the wheel support is turned about the king pin axis in response to displacement of the rear wheel turning rod. A coil spring is connected between the wheel support and the vehicle body and restrains vertical motion of the wheel support under the counterforce thereof, the coil spring being arranged so that the line of action of the counterforce is tilted with respect to the king pin axis so that it is not parallel to the king pin axis, does not intersect the king pin axis and is directed such that the counter force turns the wheel support in the toe-out direction of the rear wheel thereon.

8 Claims, 8 Drawing Sheets

FIG.14

REAR SUSPENSION SYSTEM FOR FOUR-WHEEL-STEERED VEHICLE

BACKGROUND OF THE INVENTION

1. Field of the Invention

This invention relates to a rear suspension system for a four-wheel-steered vehicle in which both the front and rear wheels turn in response to the rotation of the steering wheel.

2. Description of the Prior Art

Recently, there has been put into practice a four-wheel-steered vehicle in which both the front and rear wheels turn in response to the rotation of the steering wheel. Though the relationship between how the rear wheels turn and how the front wheels turn varies, generally, the rear wheels turn in a direction opposite to that of the front wheels when the turning angle of the steering wheel is large, that is, when the vehicle speed is low; and they turn in the same direction as that of the front wheels when the turning angle of the steering wheel is small, that is, when the vehicle speed is high. When the turning direction of the rear wheels is controlled in this manner, the turning radius at low speeds is minimized, and the running stability at high speeds is improved, as disclosed in U.S. Pat. No. 4,295,657, for instance.

When the rear wheels turn in the same direction as the front wheels, the turning angle of the rear wheels is very small, and accordingly, it must be accurately controlled.

In the rear wheel turning mechanism in a four-wheel-steered vehicle, a knuckle arm integrally formed with a wheel support is connected to a tie rod by way of a ball joint. However, there is a problem in that the slight play which inherently exists in the ball joint causes the response of the rear wheels to the rear wheel turning action to deteriorate. Further, the side force acting on the rear wheels during cornering imparts a load to the tie rod and adversely affects the accuracy with which the rear wheels turn.

SUMMARY OF THE INVENTION

In view of the foregoing observations and description, the primary object of the present invention is to provide a rear suspension system for a four-wheel-steered vehicle in which the influence of the play in the ball joint on the response of the rear wheels to the rear wheel turning action is suppressed.

Another object of the present invention is to provide a rear suspension system for a four-wheel-steered vehicle in which the load acting on the tie rod during cornering is reduced.

The rear suspension system in accordance with the present invention comprises a wheel support which supports a rear wheel and is connected to a rear wheel turning rod member of the rear wheel turning mechanism so that the rear wheel on the wheel support is turned about a king pin axis when the rear wheel turning rod member is displaced, a wheel guide means which is connected to the wheel support and guides the wheel support so that the rear wheel on the wheel support is turned about the king pin axis in response to displacement of the rear wheel turning rod member, and a damping means which is connected between the wheel support and the vehicle body and restrains vertical motion of the wheel support under the counterforce thereof, the damping means being arranged so that the line of action of the counterforce is tilted with respect to the king pin axis, so that it is not parallel thereto, does not intersect the king pin axis and is directed such that the counterforce turns the wheel support in the toe-out direction of the rear wheel thereon.

DESCRIPTION OF THE PREFERRED EMBODIMENT

Figure 3:
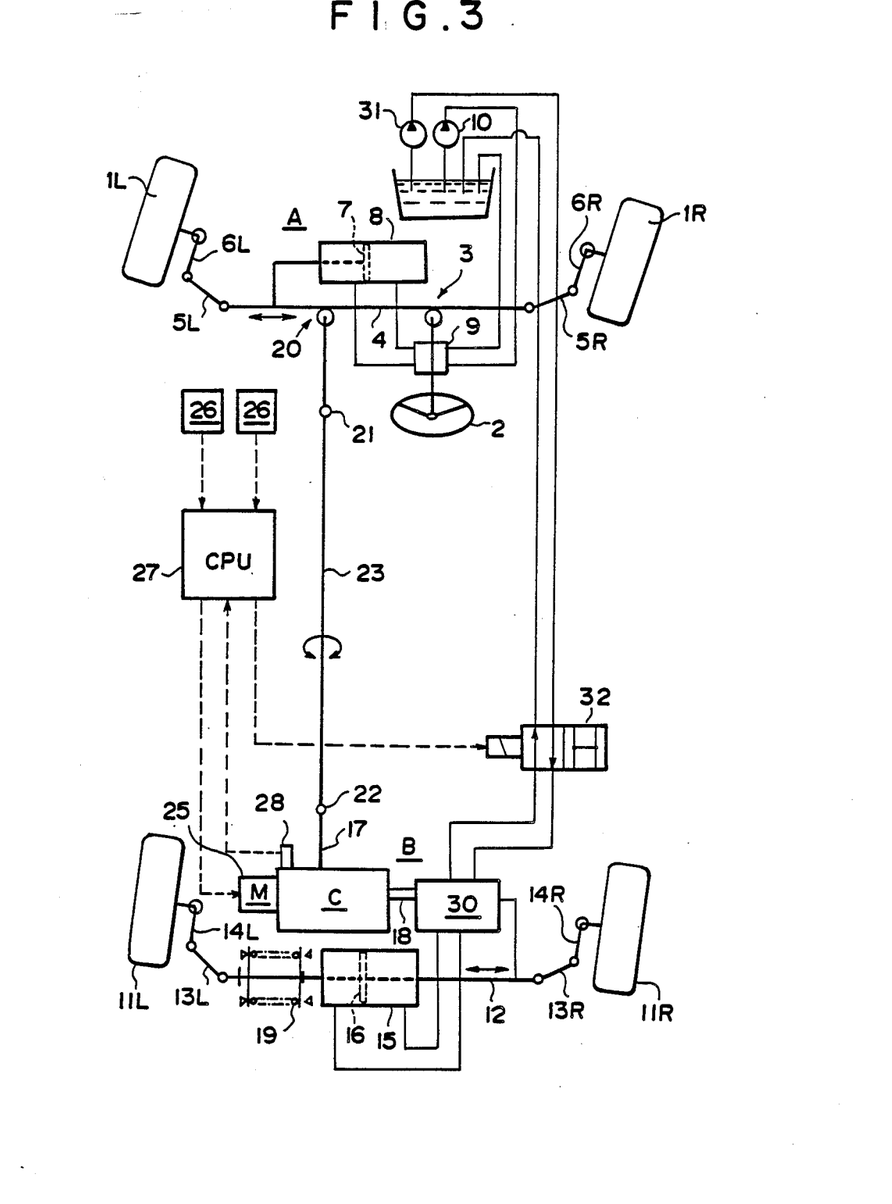
FIG. 3 is a schematic view of a four-wheel-steered vehicle in which the rear suspension system shown in FIG. 1 is employed.

In FIG. 3, a four-wheel-steered vehicle has left and right front wheels 1L and 1R and left right rear wheels 11L and 11R. The left and right front wheels 1L and 1R are turned by a front wheel turning mechanism A which comprises a steering wheel 2, a front wheel turning rod 4, a rack and pinion mechanism 3 which converts the rotation of the steering wheel 2 into a linear motion of the front wheel turning rod 4 in the transverse direction of the vehicle body, and left and right knuckle arms 6L and 6R which are respectively connected to opposite ends of the front wheel turning rod 4 by way of tie rods 5L and 5R. Further, the front wheel turning mechanism A is provided with a power steering system which comprises a power cylinder 8 having a piston 7; a control valve 9 which switches the hydraulic line for feeding hydraulic pressure to the power cylinder 8 in response to the rotation of the steering wheel 2; and an oil pump 10.

The left and right rear wheels 11L and 11R are turned by a rear wheel turning mechanism B which comprises a rear wheel turning rod 12, and left and right knuckle arms 14L and 14R which are respectively connected to opposite ends of the rear wheel turning rod 12 by way of tie rods 13L and 13R. The rear wheel turning mechanism B is further provided with a power steering system which comprises a power cylinder 15 through which the rear wheel turning rod 12 extends, and a piston 16 which is fixed to the rear wheel turning rod 12. A centering spring 19 urges the rear wheel turning rod 12 toward the neutral position where the rear wheels 11L and 11R are held in the straight ahead position.

Figure 4:
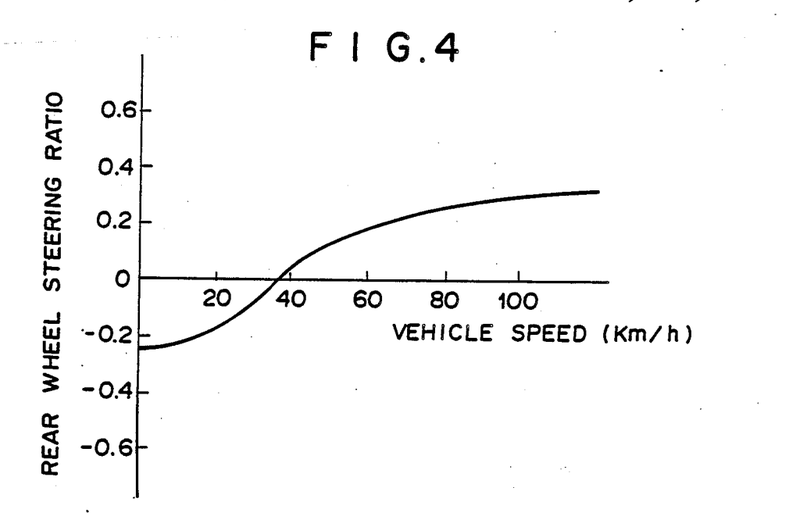
FIG. 4 is a graph for illustrating the relation between the vehicle speed and the rear wheel steering ratio.

The rear wheel turning mechanism B is provided with a rear wheel steering ratio changing mechanism C which changes the rear wheel steering ratio (which is the ratio of the rear wheel turning angle $\theta_R$ to the front wheel turning angle $\theta_F$) according to the vehicle speed as shown in FIG. 4. Reference numeral 17 denotes an input shaft of the rear wheel steering ratio changing mechanism C, and reference numeral 18 denotes a control rod which functions as an output shaft of the same. The linear motion of the front wheel turning rod 4 in the transverse direction of the vehicle body is converted into rotational motion by a second rack and pinion mechanism 20 and is transmitted to the input shaft 17 of the rear wheel steering ratio changing mechanism C by way of universal joints 21 and 22 a connecting rod 23. The control rod 18 is moved in parallel to the rear wheel turning rod 12. The rear wheel steering ratio changing mechanism C is provided with a stepping motor 25 which changes the rear wheel steering ratio under the control of a control circuit (CPU) 27. The control circuit 27 receives outputs from a pair of vehicle speed sensors 26, which perform duplicate functions for reasons of safety, and controls the turning direction and turning angle of the stepping motor 27 according to the vehicle speed.

The rear wheel steering ratio changing mechanism C is further provided with a rear wheel steering ratio sensor 28 which detects the actual rear wheel steering ratio. The outputs from the sensor 28 are fed back to the control circuit 27. The arrangement and operation of the rear wheel steering ratio changing mechanism C are well known and disclosed, for instance, in U.S. Pat. No. 4,601,357, and accordingly will not be described in more detail here. The control rod 18 acts as the output shaft of the rear wheel steering ratio changing mechanism C and actuates a spool valve type control valve 30 of the power steering system for the rear wheels so that the rear wheels are turned in the same direction as the front wheels (same phase) when the vehicle speed is higher than 35Km/h, are kept in the neutral position irrespective of the turning angle of the front wheels in the vehicle speed range near 35Km/h, and are turned in the direction opposite to that of the front wheels (reverse phase) when the vehicle speed is lower than 35Km/h as shown in FIG. 4. In FIG. 4, a positive rear wheel steering ratio indicates that the rear wheels are turned in the same direction as the front wheels, and a negative rear wheel steering ratio indicates that the rear wheels are turned in a direction opposite to that of the front wheels.

Hydraulic oil is fed to the control valve 30 from an oil pump 31 by way of a solenoid valve 32. The solenoid valve 32 cuts off the hydraulic oil being fed to the control valve 30 under the control of the control circuit 27 when the control system fails, thereby releasing the hydraulic pressure in the power cylinder 15 so that the rear wheel turning rod 12 is returned to the neutral position under the force of the centering spring 19. That is, when the control system fails, the rear wheels are not turned even if the front wheels are returned to the straight-ahead position after having been turned away from the straight-ahead position.

The solenoid valve 32 may be provided in a bypass passage which is provided between the hydraulic line to the control valve 30 and the hydraulic line from the control valve 30 to the oil reservoir.

Figure 1:
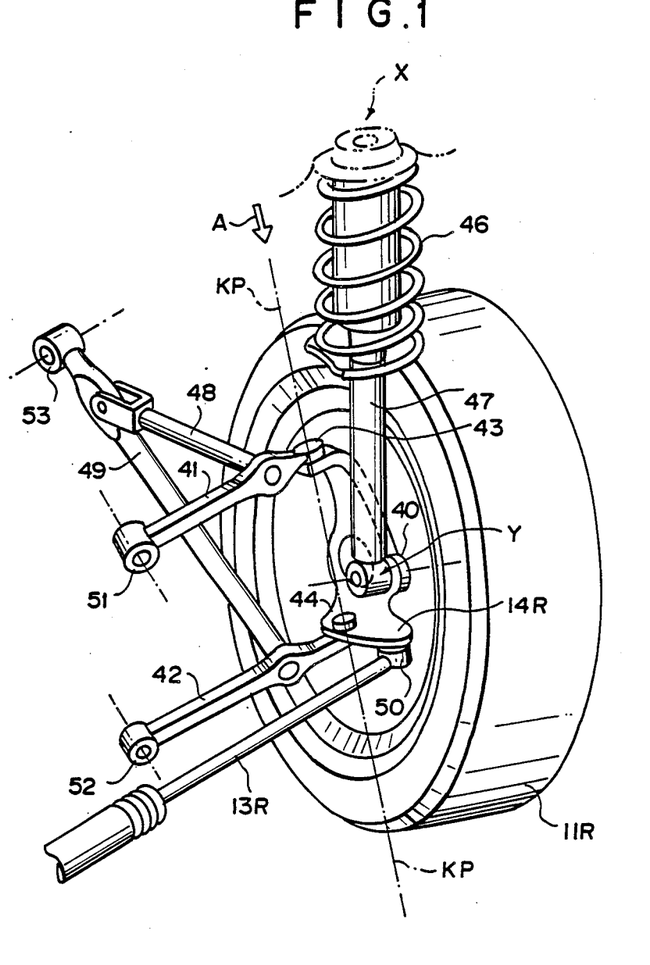
FIG. 1 is a perspective view showing a rear suspension system in accordance with an embodiment of the present invention.

FIG. 1 shows a rear suspension system in accordance with an embodiment of the present invention which is applied to the four-wheel-steered vehicle having the rear wheel turning mechanism B. The rear suspension system supports the right rear wheel 11R. In FIG. 1, the knuckle arm 14R projects rearward and is connected to the tie rod 13R by way of a ball joint 50. The knuckle arm 14R is formed integrally with a wheel support (hub carrier) 40. The wheel support 40 is connected to an I-shaped upper arm 41 and an I-shaped lower arm 42, respectively, by way of ball joints 43 and 44. Thus a double-wishbone of type suspension is formed. The upper arm 41 and the lower arm 42 are connected to the vehicle body by way of resilient bushings 51 and 52, respectively. The king pin axis KP, which joins the centers of the ball joints 43 and 44, is tilted forward and inward from the vertical as clearly shown in FIGS. 2a and 2b. The king pin axis KP intersects the road surface at point P which is on the outside and rear side of the center G of the tread of the right rear wheel 11R, and accordingly, the caster trail and the king pin offset are negative.

A coil spring 46 is fit on a spring guide shaft 47 which extends in a substantially vertical direction. The lower end of the spring guide shaft 47 is rotatably connected to the wheel support 40 on the rear side of the king pin axis KP. The upper arm 41 and the lower arm 42 are respectively connected to the rear ends of trailing links 48 and 49. The front end of the trailing link 49 is connected to the vehicle body by way of a resilient bushing 53.

Figure 2A:
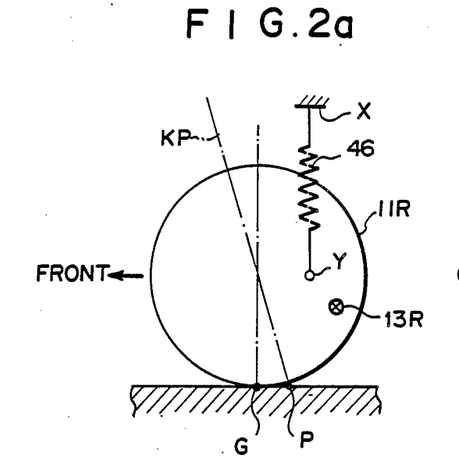
FIGS. 2a to 2c are schematic views for illustrating the operation of the rear suspension system shown in FIG. 1, FIG. 2a being taken from the inner side of the right rear wheel, FIG. 2b being taken from the front side of the vehicle and FIG. 2c being taken in the direction of arrow A in FIG. 1.
Figure 2B:
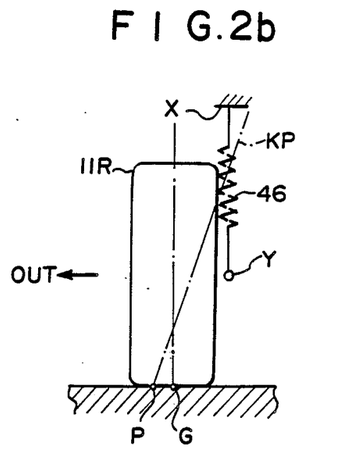
Figure 2C:
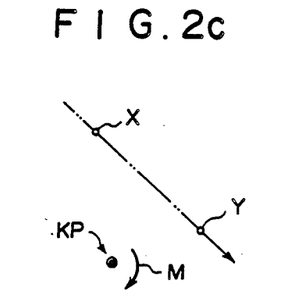
Figure 12:
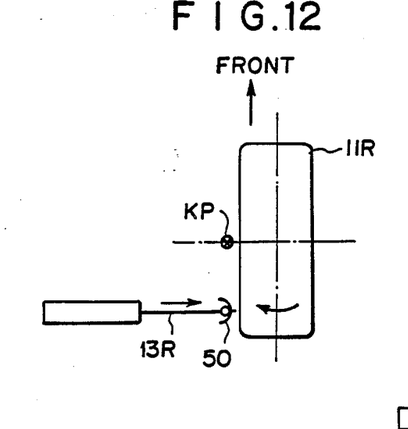
FIGS. 12 and 13 are schematic views for illustrating the results of the invention.

When the rear suspension system is arranged in this manner, the counterforce of the coil spring 46 generates a moment about the king pin axis KP which causes the rear wheel 11R to turn in the toe-out direction as can be seen from FIG. 2c. In FIG. 2c, the arrow joining the points X and Y shows the line of action of the counterforce, the points X and Y respectively being the joints of the spring guide shaft with the vehicle body and the wheel support, and arrow M shows the moment generated by the counterforce of the coil spring 46. This moment will be referred to as "the toe-out moment", hereinbelow. The toe-out moment acts as a force which pushes the tie rod 13R, which is connected to the wheel support 40 on the rear side of the king pin axis KP, while deforming the resilient bushings 51 to 53 as shown in FIG. 12, whereby the ball joint 50 between the tie rod 13R and the wheel support 40 is pressed against the tie rod 13R so that the play in the ball joint 50 is canceled. When the vehicle turns left at a speed in the same phase range (higher than 35Km/h), the right rear wheel 11R, which is the outer wheel, is turned in the toe-in direction by the tie rod 13R. A this time, the force of the tie rod 13R is transmitted to the wheel support 40 with the play in the ball joint still being canceled. Accordingly, the response of the rear wheel 11R to the rear wheel turning action is improved.

Further since the caster trail is negative as described above, the side force acting on the center G of the tread of the right rear wheel 11R urges the wheel 11R in the toe-in direction and accordingly acts as an input load to the tie rod 13R. However, in this embodiment, the force urging the wheel 11R in the toe-in direction is canceled by the counterforce of the coil spring 46 which urges the wheel 11R in the toe-out direction. Therefore, the centering spring 19, which returns the rear wheels 11L and 11R to the straight-ahead position in the case of a failure in the control system, need not overcome the force urging the wheel 11R in the toe-in direction and may be relatively weak. This reduces the load on the hydraulic system, and accordingly, the oil pump 31 may have a relatively small capacity, for example.

As can be understood from the description above, in this embodiment, it is important that the line of action of the counterforce of the coil spring 46 be tilted with respect to the king pin axis KP so that it is not parallel to the king pin axis KP, does not intersect the king pin axis KP, and is directed such that the counterforce turns the wheel support 40 in the toe-out direction as shown in FIG. 2c.

Figure 5A:
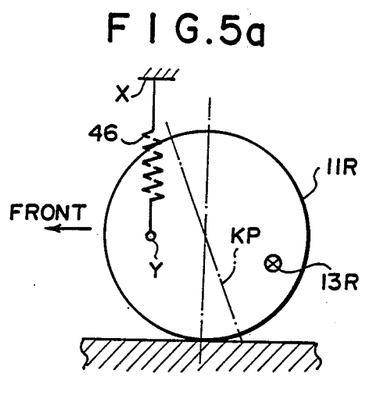
FIGS. 5a to 5c are views similar to FIGS. 2a to 2c but for another embodiment of the present invention.
Figure 5B:
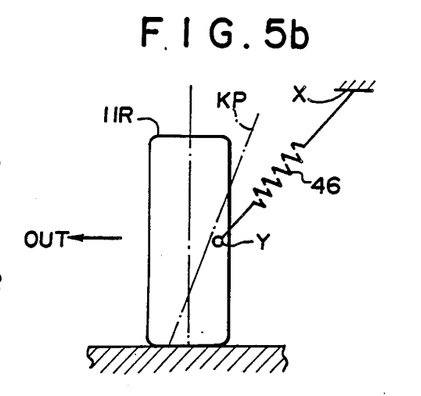
Figure 5C:
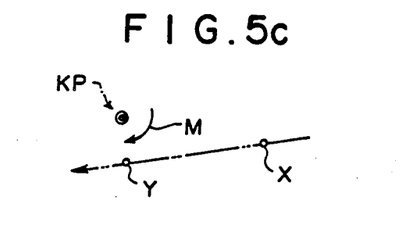

FIGS. 5a to 5c are views similar to FIGS. 2a to 2c but showing another embodiment of the present invention. In this embodiment, the alignment of the king pin axis KP and the mounting position of the tie rod 13R are the same as those in the embodiments shown in FIG. 2. However, in this embodiment, the spring guide shaft 47 is connected to the wheel support 40 on the front side of the king pin axis KP and is tilted inward from the vertical by an angle larger than the king pin axis KP. As can be seen from FIG. 5c, in this embodiment the counterforce of the coil spring 46 can also generate a toe-out moment.

Figure 6A:
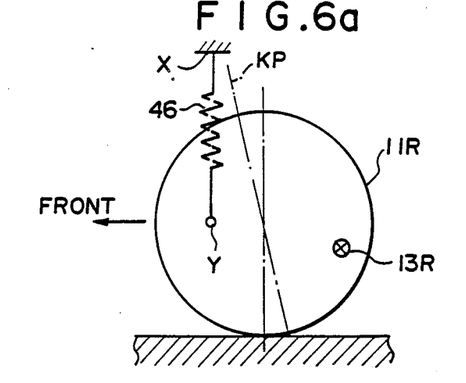
FIGS. 6a to 6c are views similar to FIGS. 2a to 2c but for still another embodiment of the present invention.
Figure 6B:
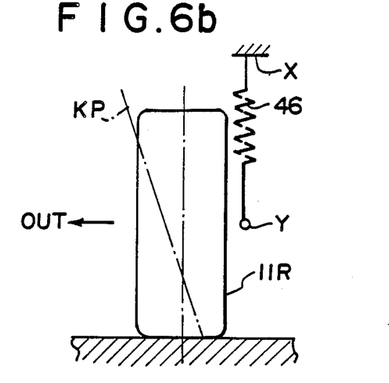

In the embodiment shown in FIGS. 6a and 6b, the spring guide shaft 47 is connected to the wheel support 40 on the front side of the king pin axis KP and is vertical, and the king pin axis KP is tilted forward and outward. In this embodiment the counterforce of the coil spring 46 can also generate a toe-out moment as can be seen from FIG. 6c.

Figure 7A:
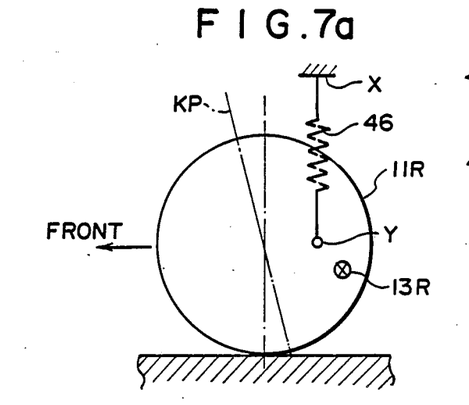
FIGS. 7a to 7c are views similar to FIGS. 2a to 2c but for still another embodiment of the present invention.
Figure 7B:
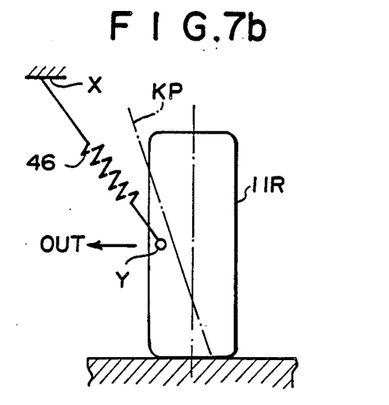

In the embodiment shown in FIGS. 7a and 7b, the spring guide shaft 47 is connected to the wheel support 40 on the rear side of the king pin axis KP and is tilted outward, and the king pin axis KP is tilted forward and outward. In this embodiment the counterforce of the coil spring 46 can also generate a toe-out moment as can be seen from FIG. 7c.

Figure 6C:
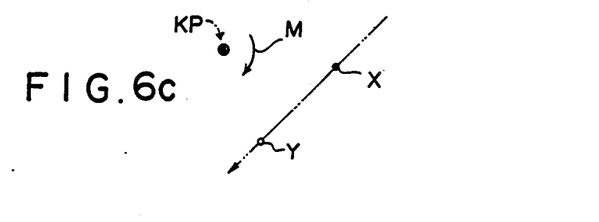
Figure 7C:
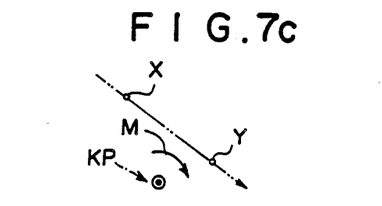
Figure 8A:
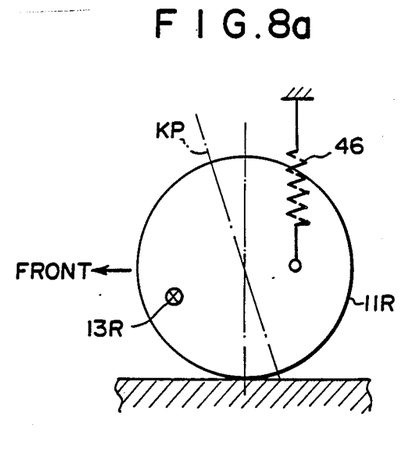
FIGS. 8a and 8b are views similar to FIGS. 2a and 2b but for still another embodiment of the present invention.
Figure 8B:
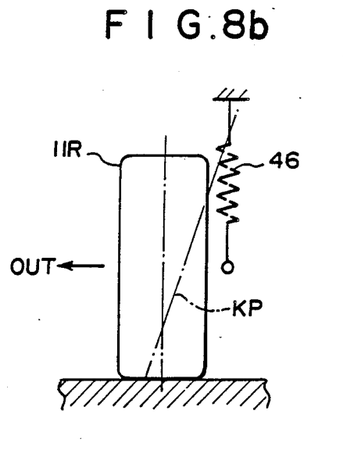
Figure 9A:
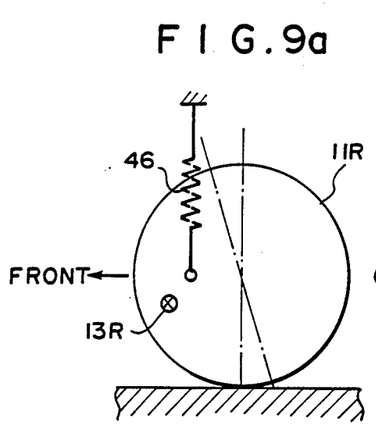
FIGS. 9a and 9b are views similar to FIGS. 2a and 2b but for still another embodiment of the present invention.
Figure 9B:
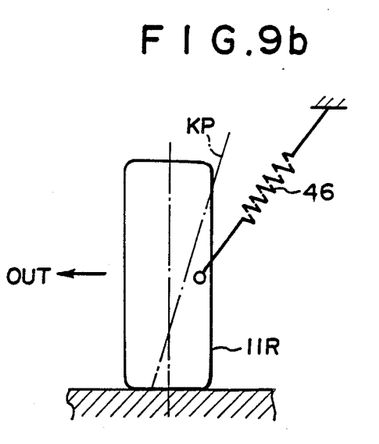
Figure 10A:
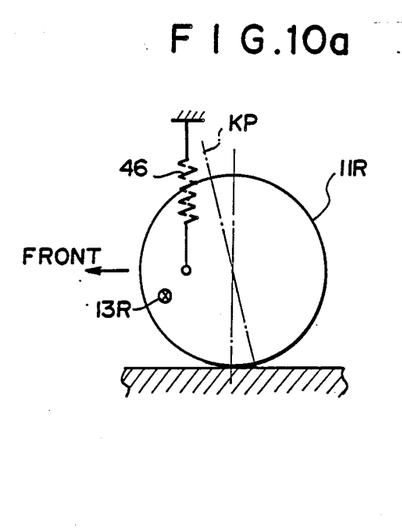
FIGS. 10a and 10b are views similar to FIGS. 2a and 2b but for still another embodiment of the present invention.
Figure 10B:
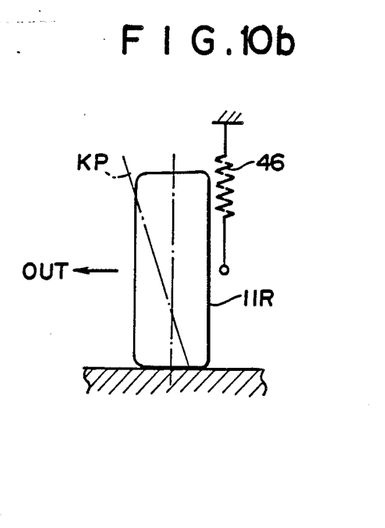
Figure 11A:
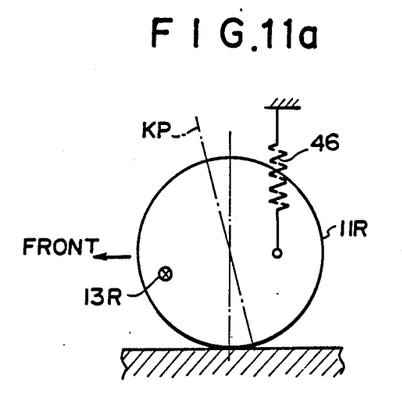
FIGS. 11a and 11b are views similar to FIGS. 2a and 2b but for still another embodiment of the present invention.
Figure 11B:
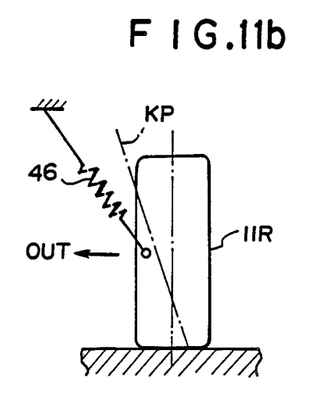

In the embodiments shown in FIGS. 5 to 7, the tie rod 13R is connected to the wheel support 40 on the rear side of the king pin axis KP, and accordingly, the ball joint 50 between the tie rod 13R and the wheel support 40 is pressed against the tie rod 13R so that the play in the ball joint 50 is cancelled in the manner described above in conjunction with FIG. 12.

Figure 13:
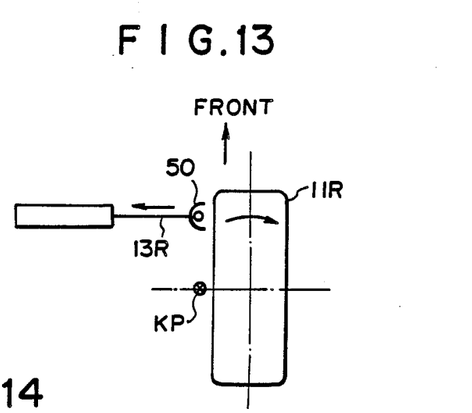

The embodiments shown in FIGS. 8 to 11 are respectively the same as the embodiments shown in FIGS. 2, and 5 to 7 except that the tie rod 13R is connected to the wheel support 40 on the front side of the king pin axis KP. In these embodiments the counterforce of the coil spring 46 also generates a toe-out moment as described above in conjunction with FIGS. 2c and 5c to 7c. In these embodiments, the toe-out moment acts as a force which pulls the tie rod 13R which is connected to the wheel support 40 on the front side of the king pin axis KP as shown in FIG. 13, whereby the ball joint 50 between the tie rod 13R and the wheel support 40 is kept under tension so that the play in the ball joint 50 is cancelled.

In all the embodiments described above, the caster trail is negative.

Figure 14:
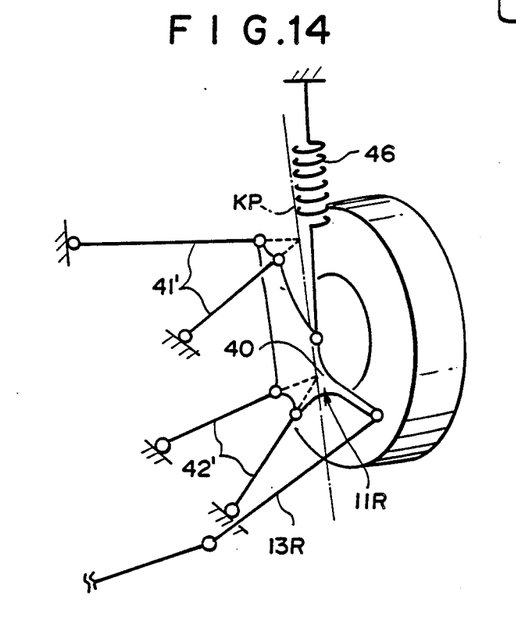
FIG. 14 is a view similar to FIG. 1 but showing an example of the concrete arrangement for the embodiments shown in FIGS. 6, 7, 10 and 11.

Though in the embodiments shown in FIGS. 2, 5, 8 and 9, the king pin axis KP is tilted inward from the vertical, in the embodiments shown in FIGS. 6, 7, 10 and 11, the king pin axis KP is tilted outward from the vertical. The king pin axis KP can be tilted outward when the rear suspension system is arranged as shown in FIG. 14. In FIG. 14, the rear suspension system comprises a pair of upper arms 41' and a pair of lower arms 42'. The upper arms 41' are connected between the wheel support 40 and the vehicle body so that the distance therebetween becomes smaller toward the wheel support 40. Similarly, the lower arms 42' are connected between the wheel support 40 and the vehicle body so that the distance therebetween becomes smaller toward the wheel support 40. In this rear suspension system, the king pin axis KP is an imaginary line which joins the point of intersection of the extensions of the upper arms 41' and the point of intersection of the extensions of the lower arms 42'.

Though in the embodiments described above, a coil spring is used as the damping means, the damping means may be formed of a damper which generates a counterforce in proportion to the velocity of the force imparted thereto, or may be formed of both a coil spring and a damper.

Further, though in the embodiments described above, the present invention is applied to a double wishbone type rear suspension system, the present invention may be applied to a strut type rear suspension system in which the damper axis and the king pin axis are not parallel to each other and do not intersect each other.

The components of the rear suspension system of the present invention need not be always in the positions described above in conjunction with FIGS. 2 and 5 to 11, so long as they are in position for the aforesaid same phase range.

What is claimed is:

1. A rear suspension system for a four-wheel-steered vehicle which is provided with a front wheel turning mechanism and a rear wheel turning mechanism and in which both front and rear wheels are turned in response to the rotation of a steering wheel and at least outer one of the rear wheels is turned in the same direction as the front wheels when the steering wheel is turned while the vehicle is in a predetermined operating condition, the rear suspension system comprising a wheel support which supports a rear wheel and is connected to a rear wheel turning rod member of the rear wheel turning mechanism so that the rear wheel on the wheel support is turned about a king pin axis when the rear wheel turning rod member is displaced, a wheel guide means which is connected to the wheel support and guides the wheel support so that the rear wheel on the wheel support is turned about the king pin axis in response to displacement of the rear wheel turning rod member, and a damping means which is connected between the wheel support and the vehicle body and restrains vertical motion of the wheel support under the counterforce thereof, the damping means being arranged so that the line of action of the counterforce is tilted with respect to the king pin axis so that it is not parallel to the king pin axis, does not intersect the king pin axis and is directed such that the counterforce turns the wheel support in the toe-out direction of the rear wheel thereon.

2. A rear suspension system as defined in claim 1 in which said damping means comprises a spring member which is compressed between the wheel support and the vehicle body and urges the wheel support downward relative to the vehicle body.

3. A rear suspension system as defined in claim 2 in which said spring member comprises a coil spring which is fit on a spring guide member.

4. A rear suspension system as defined in claim 1 in which said wheel guide means comprises upper and lower lateral links which extend in the transverse direction of the vehicle body.

5. A rear suspension system as defined in claim 4 in which said king pin axis passes through the points at which said upper and lower lateral links are connected to the wheel support.

6. A rear suspension system as defined in claim 4 in which at least one of the upper and lower lateral links is formed of a pair of links which are separate from each other.

7. A rear suspension system as defined in claim 1 in which said king pin axis intersects the ground at a point to the rear of where the rear wheel makes contact with the ground.

8. A rear suspension system as defined in claim in which said wheel support is pivoted on the rear wheel turning rod member by way of a ball joint.

* * * * *